United States Patent
Pummell

[19]

[11] Patent Number: 5,393,422
[45] Date of Patent: Feb. 28, 1995

[54] DISPOSABLE FILTER HAVING A FLEXIBLE CASING

[75] Inventor: Leslie J. H. Pummell, Rickmansworth/Herts, Great Britain

[73] Assignee: Eastman Kodak Company, Rochester, N.Y.

[21] Appl. No.: 39,210

[22] PCT Filed: Oct. 2, 1991

[86] PCT No.: PCT/EP91/01882

§ 371 Date: Apr. 13, 1993

§ 102(e) Date: Apr. 13, 1993

[87] PCT Pub. No.: WO92/06762

PCT Pub. Date: Apr. 30, 1992

[30] Foreign Application Priority Data

Oct. 19, 1990 [GB] United Kingdom ............... 9022778

[51] Int. Cl.⁶ ........................................ B01D 27/06
[52] U.S. Cl. ................... 210/232; 210/282; 210/489; 210/493.5
[58] Field of Search ............... 210/232, 238, 264, 282, 210/348, 350, 356, 484, 488, 489, 490, 493.1, 493.5

[56] References Cited

U.S. PATENT DOCUMENTS

| | | | |
|---|---|---|---|
| 3,625,652 | 12/1971 | Fujimoto et al. | 210/282 |
| 4,239,368 | 12/1980 | Krause et al. | |
| 4,635,663 | 1/1987 | Rollins et al. | 210/282 |
| 4,775,513 | 10/1988 | Marks | 210/282 |
| 4,828,717 | 5/1989 | DeLeeuw et al. | |
| 4,879,030 | 11/1989 | Stache | 210/282 |
| 4,983,286 | 1/1991 | Inagaki et al. | 210/282 |

FOREIGN PATENT DOCUMENTS

| | | |
|---|---|---|
| 1192623 | 5/1965 | Germany . |
| 3240326 | 5/1984 | Germany . |
| 85/05616 | 12/1985 | WIPO . |

*Primary Examiner*—Robert A. Dawson
*Assistant Examiner*—W. L. Walker
*Attorney, Agent, or Firm*—Nixon, Hargrave, Devans & Doyle

[57] ABSTRACT

A disposable filter including a flexible casing and at least one filter element. The flexible casing and filter elements are expendable from a substantially flat form for use and are collapsible to a substantially flat form after use for disposable.

4 Claims, 1 Drawing Sheet

DISPOSABLE FILTER HAVING A FLEXIBLE CASING

This invention relates to filters and is more particularly concerned with disposable filters.

Various types of filters are known. However, regardless of the size of the filter, there may be problems associated with storing filters prior to use and also with their disposal after use.

According to one aspect of the present invention, there is provided a disposable filter characterized by a flexible casing having an inlet into which the material to be filtered is introduced, and at least one filter element sealed to the inside of the flexible casing and positioned across the direction of flow of the material to be filtered, the flexible casing being expandable from a substantially flat form for use and collapsible to a substantially flat form after use for disposal.

By this arrangement, the filter can be flat-packed for storage and shipping, expanded for use, and then collapsed again for ease of disposal. Advantageously, such an arrangement minimizes solution loss on removal of the filter as it can be squeezed to remove excess solution prior to disposal.

The flexible casing is open at one end to provide an outlet for the filtered material.

Advantageously, at least one ion-exchange resin bed may be retained by the or each filter element.

In a preferred embodiment of the present invention, a plurality of filter elements is provided, each element having a different pore size. This has the advantage that progressive filtration can be achieved.

For a better understanding of the present invention, reference will now be made, by way of example only, to the accompanying drawings in which.

Figure 1:
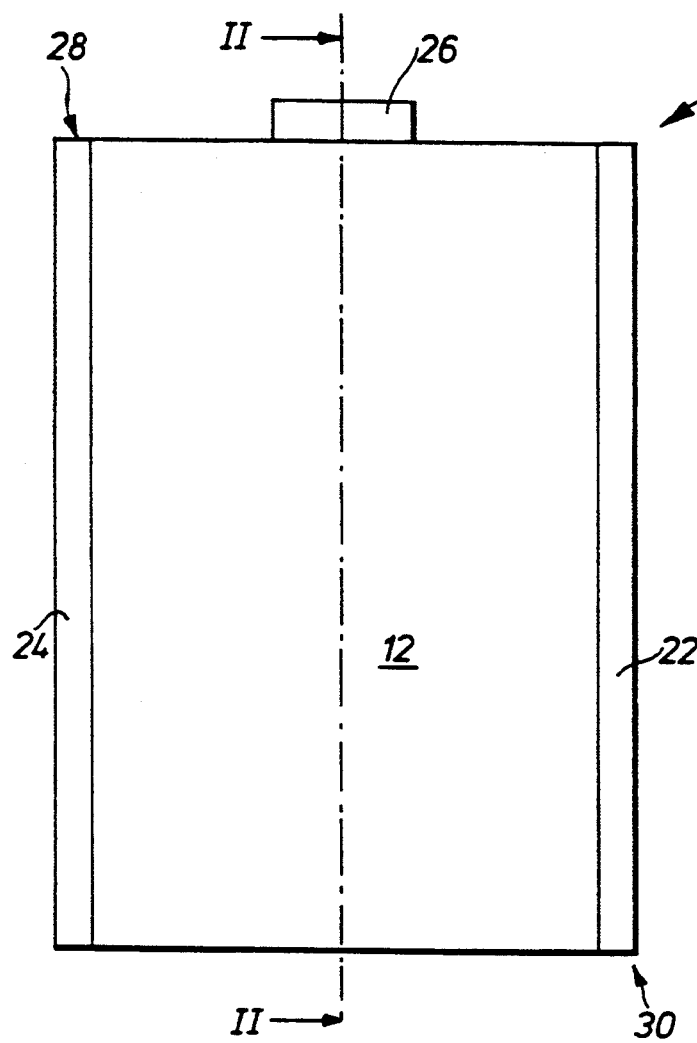
FIG. 1 is a side elevation of a filter according to the present invention.
Figure 2:
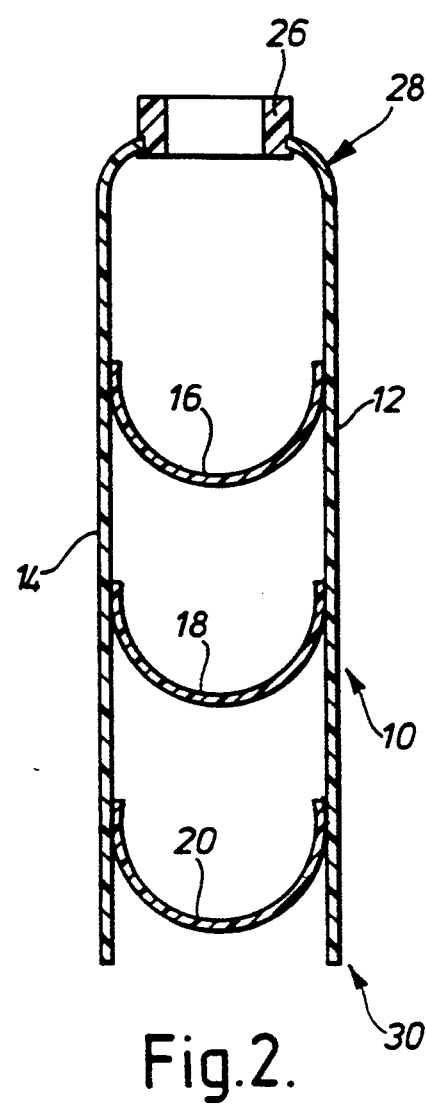
FIG. 2 is a sectioned view taken along lines II—II of FIG. 1.

Referring to FIGS. 1 and 2, a disposable filter 10 is shown. The filter 10 comprises a pair of walls 12, 14 between which three filter elements 16, 18, 20 are arranged. The filter elements 16, 18, 20 can be seen more clearly in FIG. 2. The walls 12, 14 are made from polymeric sheet and are joined to one another, trapping each filter member 16, 18, 20 between them, by respective welds 22, 24. Each filter element 16, 18, 20 is folded so that the fold lies downstream in the filter 10 as shown. The filter media could be supported by perforated or porous polymeric materials depending on the fineness of the filtration required.

An inlet 26 is formed in one end 28 of the filter 10, the walls 12, 14 being joined by a further weld (not shown) across that end 28 but which allows fluid to enter the filter through the inlet 26. End 30 of the filter 10 remote from the inlet 26 is open (as is more clearly seen in FIG. 2). In the particular embodiment described, the inlet 26 comprises a polymeric insert which has a circular cross-section. Alternatively, the insert may be of elliptical cross-section. In, other embodiments of the invention, the inlet 26 may simply be an opening which can be attached, by known means, to the supply of solution to be filtered.

The filter 10 is supplied in flat-pack form, and is expanded in use by connecting the inlet 26 to a supply (not shown) of solution to be filtered. The filter 10 expands under the pressure of solution being pumped into it.

The filter elements 16,. 18, 20 shown in FIG. 2 initially lie flat between the walls 12, 14 before solution is pumped into the filter 10. As solution is pumped into the filter 10, the walls 12, 14 are forced apart and the filter elements 16, 18, 20 take up configurations approximately as shown in FIG. 2.

After the filter 10 has been used for a predetermined length of time or for filtering a predetermined amount of solution, the solution supply is disconnected from the inlet 26 and the filter 10 is squeezed to remove any excess solution and to compress it back into a generally flat configuration ready for disposal.

Figure 3:
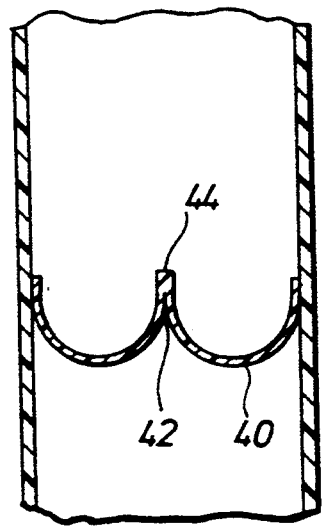
FIG. 3 is an enlarged sectioned view similar to FIG. 2, but showing an alternative configuration of a filter element constructed in accordance with the present invention.

FIG. 3 illustrates a filter element configuration which could be used to optimize the surface area of the filter element presented to the solution. The filter element 40 is formed to have a pleat 42 at its center 44 which allows more solution to pass through for filtering.

The filter elements 16, 18, 20 may be all made of material which has the same pore size to filter out a certain size of particle. Alternatively, it is preferred that the filter elements 16, 18, 20 provide progressive filtration. This is achieved by making each element from material which has diminishing pore size, namely, element 16 has a larger pore size than element 18, which in turn has a larger pore size than element 20. In this way, the coarsest particles are removed first, followed by progressively finer ones. This has the added advantage that filter blocking is reduced and filter life is extended.

Filters can easily be packed flat and large numbers can conveniently be stored and transported in simple, space-saving boxes.

In one particular use of a filter according to the present invention is in compact film and paper processing machines. However, these filters could be used in any situation where it is desired to carry out filtration of relatively clean solutions. In the case of using such a filter in a minilab, the open end 30 could simply be allowed to become submerged in filtered solution in the receiving tank.

If the filter 10 is to be used in a system having relatively low pressure, the filter can easily be attached to the end of a solution pipe and dangled into a tank which receives the filtered solution. At higher system pressures, the filter may need to be supported in a suitable housing. The internal size of the housing is chosen to be marginally smaller than the outside dimensions of the inflated filter. In this way, high system pressures are accommodated by the housing and not solely by the filter.

In an alternative method of attaching the filter to the solution supply, the end 28 is slid over the solution recirculation pipe and seal it using an O-ring placed over the end. Compression rings and clamps could also be used for attaching the filter to the solution supply. These methods of attachment remove the need for an insert to form the inlet.

In order to change the filter, it is unclipped from the solution supply and withdrawn from the solution. In order to remove excess solution from the filter, it may be gripped by a pair of soft rollers which slowly wind the filter out of the tank and thereby squeeze solution out of the filter. This method of changing the filter minimizes operator contact with the tank solution.

In some filtering processes, it is necessary to pass a solution through a bed of reactive particles, for example, through a bed of ion-exchange resin particles. A filter as described above could be used for retaining such particles for filtering purposes as well as for storage and transport. Once a bed of ion-exchange resin particles become 'exhausted' the filter can then be disposed of or returned for re-activation of the resin particles.

The walls of the filter could be made of any thin flexible polymeric material, for example, polypropylene or polyethylene.

Filters may be color-coded to indicate the filtration standard. Filters of different sizes could be made to accommodate different solution flowrates so that the desired amount of filtration is achieved.

I claim:

1. A disposable filter comprising: a flexible casing having an inlet into which the material to be filtered is introduced, and at least one filter element sealed to the inside of the flexible casing and positioned across the direction of flow of the material to be filtered, each of the filter elements is formed to have a fold which lies downstream in the filter and the flexible casing and filter elements being expandable from a substantially flat form for use and collapsible to a substantially flat form after use for disposal and wherein one or more of the filter elements is formed to have one or more pleats.

2. The filter according to claim 1, wherein the flexible casing is open at one end to provide an outlet.

3. The filter according to claim 1, further including at least one-exchange resin bed retained by one or more of the at least one filter element.

4. The filter according to claim 1, wherein a plurality of filter elements are provided, each element having a different pore size.

* * * * *